United States Patent
Shimizu et al.

(10) Patent No.: US 9,436,211 B2
(45) Date of Patent: Sep. 6, 2016

(54) CLOCK CONVERSION APPARATUS WITH AN ELASTIC STORE MEMORY FROM WHICH DATA IS WRITTEN IN SYNCHRONIZATION WITH A FIRST CLOCK AND READ OUT IN SYNCHRONIZATION WITH A SECOND CLOCK

(71) Applicant: FUJITSU LIMITED, Kawasaki-shi, Kanagawa (JP)

(72) Inventors: Makoto Shimizu, Oyama (JP); Masato Hori, Oyama (JP)

(73) Assignee: FUJITSU LIMITED, Kawasaki (JP)

( * ) Notice: Subject to any disclaimer, the term of this patent is extended or adjusted under 35 U.S.C. 154(b) by 534 days.

(21) Appl. No.: 13/846,248

(22) Filed: Mar. 18, 2013

(65) Prior Publication Data
US 2013/0232371 A1 Sep. 5, 2013

Related U.S. Application Data

(63) Continuation of application No. PCT/JP2010/066813, filed on Sep. 28, 2010.

(51) Int. Cl.
*G06F 1/12* (2006.01)
*G06F 13/42* (2006.01)
*H04L 5/00* (2006.01)
*H04L 7/00* (2006.01)
*H04L 7/033* (2006.01)
*H04J 3/07* (2006.01)

(52) U.S. Cl.
CPC ............ *G06F 1/12* (2013.01); *H04J 3/076* (2013.01); *H04L 7/005* (2013.01); *H04L 7/033* (2013.01); *H04L 7/0337* (2013.01)

(58) Field of Classification Search
CPC ......................................................... G06F 1/12
USPC .................................................... 713/400
See application file for complete search history.

(56) References Cited

U.S. PATENT DOCUMENTS

| 5,461,380 A * | 10/1995 | Peters et al. .................. 341/100 |
| 5,784,377 A * | 7/1998 | Baydar et al. ................. 370/463 |
| 6,400,614 B1 * | 6/2002 | Hiromori et al. ......... 365/189.14 |
| 6,629,251 B1 * | 9/2003 | Anderson et al. ............. 713/401 |
| 2002/0064184 A1 | 5/2002 | Kinoshita et al. |
| 2003/0076911 A1 | 4/2003 | Kobayashi et al. |
| 2007/0121394 A1 * | 5/2007 | Noda et al. .................... 365/194 |

FOREIGN PATENT DOCUMENTS

JP 2003-134076 5/2003
WO 00/74283 A1 12/2000

OTHER PUBLICATIONS

International Search Report for PCT/JP2010/066813; mailed Dec. 14, 2010.

* cited by examiner

*Primary Examiner* — Robert Cassity
(74) *Attorney, Agent, or Firm* — Staas & Halsey LLP

(57) ABSTRACT

A clock conversion apparatus comprising, an elastic store memory in which data are written in synchronization with a first clock and from which data are read out in synchronization with a second clock, a phase comparator for detecting phase difference between a third clock obtained by imparting a first variable phase shift to a divided clock of the first clock and a fourth clock obtained by imparting a second variable phase shift to a divided clock of the second clock, and an oscillator for generating a clock having frequency in accordance with the phase difference as the second clock.

8 Claims, 17 Drawing Sheets

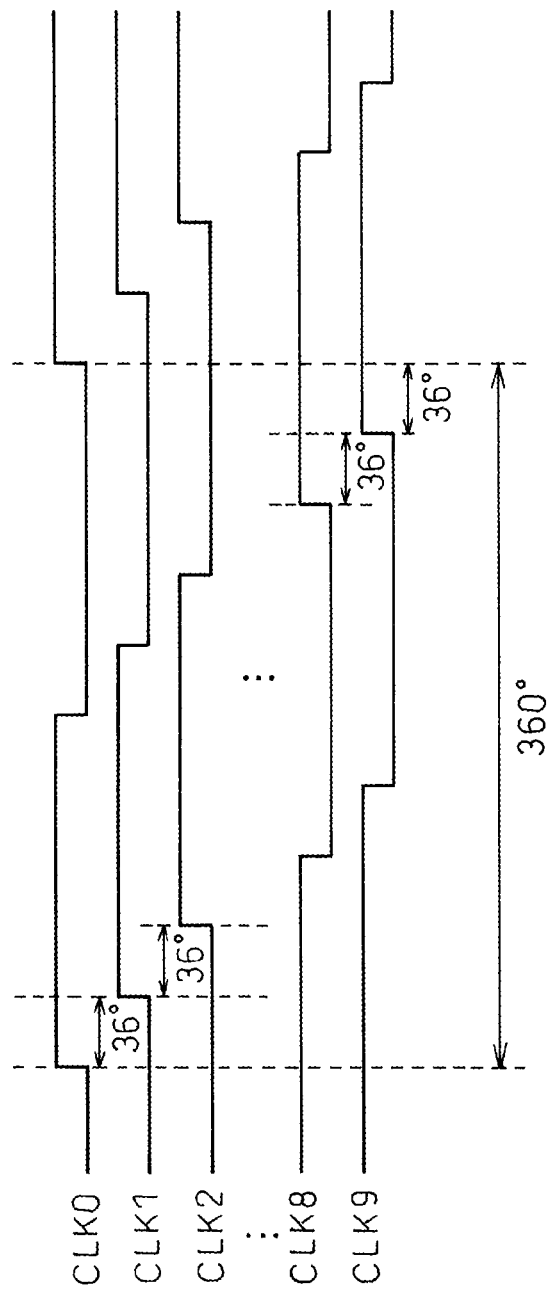

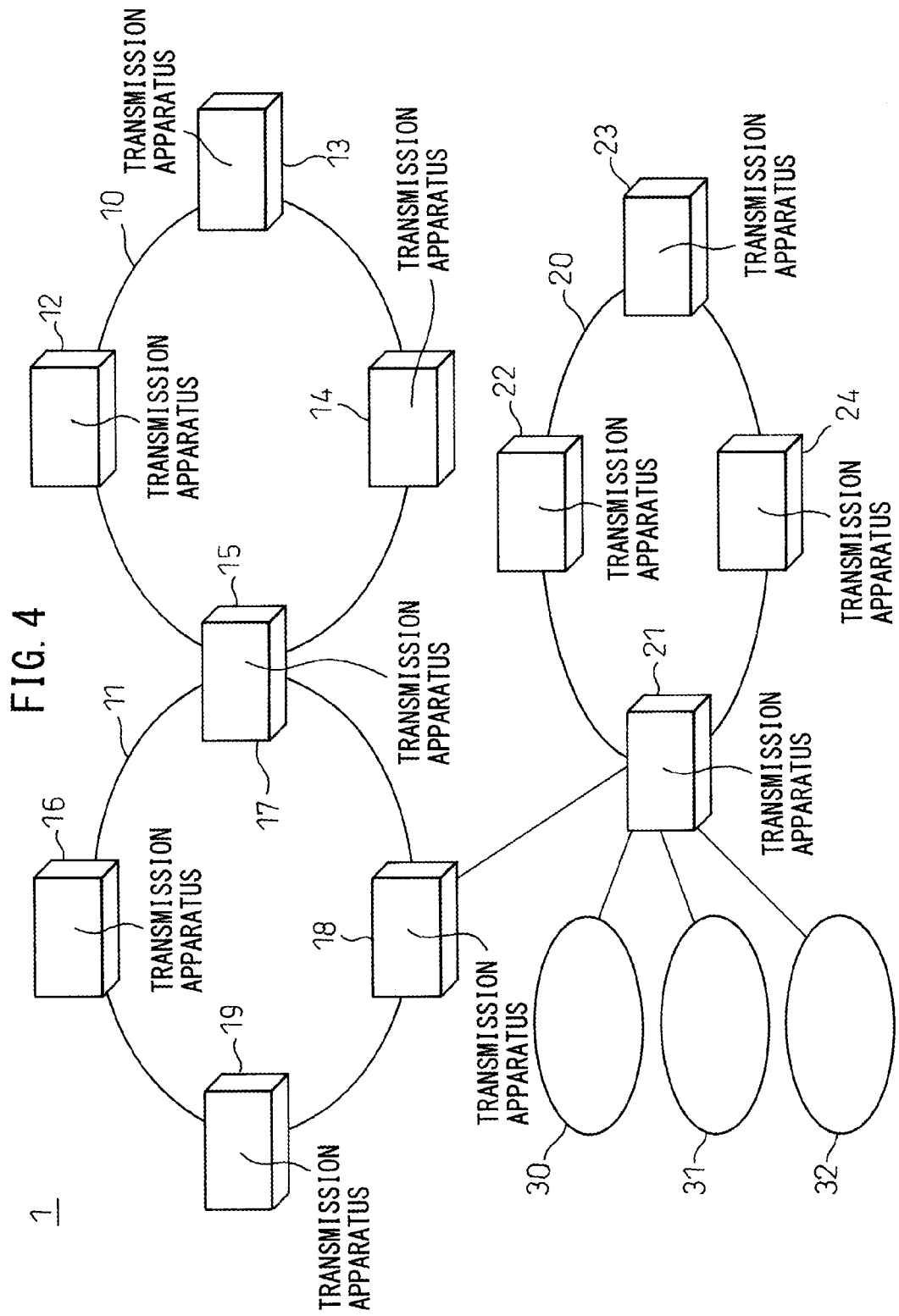

FIG. 10

| INPUT VALUE | OUTPUT VALUE |
| --- | --- |
| −16 | −3 |
| −15 | −3 |
| −14 | −3 |
| −13 | −3 |
| −12 | −3 |
| −11 | −2 |
| −10 | −2 |
| −9 | −2 |
| −8 | −2 |
| −7 | −1 |
| −6 | −1 |
| −5 | −1 |
| −4 | −1 |
| −3 | 0 |
| −2 | 0 |
| −1 | 0 |
| 0 | 0 |
| 1 | 0 |
| 2 | 0 |
| 3 | 0 |
| 4 | 1 |
| 5 | 1 |
| 6 | 1 |
| 7 | 1 |
| 8 | 2 |
| 9 | 2 |
| 10 | 2 |
| 11 | 2 |
| 12 | 3 |
| 13 | 3 |
| 14 | 3 |
| 15 | 3 |
| 16 | 3 |

FIG. 16

| INPUT VALUE | OUTPUT VALUE |
|---|---|
| 0 | 0 |
| 1 | 1 |
| ⋮ | ⋮ |
| ⋮ | ⋮ |
| $n-1$ | $n-1$ |
| $n$ | $n-1$ |
| $n+1$ | $n-1$ |
| ⋮ | ⋮ |
| ⋮ | ⋮ |
| $n+m-2$ | $n-1$ |
| $n+m-1$ | $n-1$ |

FIG. 17

| INPUT VALUE | OUTPUT VALUE |
|---|---|
| 0 | m-1 |
| 1 | m-1 |
| ⋮ | ⋮ |
| ⋮ | ⋮ |
| n-1 | m-1 |
| n | m-1 |
| n+1 | m-2 |
| ⋮ | ⋮ |
| ⋮ | ⋮ |
| n+m-2 | 1 |
| n+m-1 | 0 |

CLOCK CONVERSION APPARATUS WITH AN ELASTIC STORE MEMORY FROM WHICH DATA IS WRITTEN IN SYNCHRONIZATION WITH A FIRST CLOCK AND READ OUT IN SYNCHRONIZATION WITH A SECOND CLOCK

CROSS-REFERENCE TO RELATED APPLICATIONS

This application is a continuation application based on International application No. PCT/JP2010/66813, filed on Sep. 28, 2010, the entire contents of which are incorporated herein by reference.

FIELD

Embodiments described in the present specification relate to control of read-out clock for reading out an elastic store memory.

BACKGROUND

In some synchronous transmission networks, stuffing is performed in order to absorb the frequency fluctuation of clock signal for operating various transmission apparatuses. Synchronous transmission networks that perform stuffing include, for example, SONET (Synchronous Optical Network)/SDH (Synchronous Digital Hierarchy), OTN (Optical Transport Network), etc.

Each transmission apparatus in a synchronous transmission network performs reception processing of a received frame received in synchronization with a reception clock extracted from the received frame, and then, converts the received data into data in synchronization with the internal clock of the apparatus.

FIG. 1 is a view depicting the construction of a clock conversion unit for converting received data received in synchronization with the reception clock into data in synchronization with an internal clock of the apparatus. The clock conversion unit 100 comprises clock dividers 101, 105, 110, 116, a serial-parallel converter 102, a write controller 103, and an elastic store memory 104.

The clock conversion unit 100 also comprises a phase shifter 111, a selector 112, counters 113 and 114, a decoder 115, and a phase comparator 117. In the description that follows and in the appended drawings, a serial-parallel converter, an elastic store memory, and a selector may be denoted as "S/P", "ES", and "SEL", respectively.

The clock divider 101 divides the first clock extracted from a received frame in a prescribed division ratio. The clock divider 101 outputs the divided clock of the first clock to S/P 102, the write controller 103, ES 104 and to the counters 113 and 114.

S/P 102 receives data included in the received frame as input data, and converts the data into parallel data of prescribed bit width. The parallel data are inputted into the write controller 103.

The write controller 103 selects valid data from the input data in accordance with instruction information indicating a range of valid data in the input data, and outputs the valid data to write data bus WDT of ES 104. While outputting valid data, the write controller 103 also outputs write enable signal WEN to ES 104. Divided clock is inputted as write clock WCLK from the clock divider 101 to ES 104.

The clock divider 105 divides a second clock generated by a voltage control oscillator 200. The clock divider 105 inputs the divided clock of the second clock as read clock RCLK to ES 104. Input data stored in ES 104 are read out in accordance with a read enable signal in the timing in synchronization with the second clock. As a result, data inputted into the clock conversion unit 100 are converted to data in synchronization with the second clock.

When stuffing occurs, an amount of valid data per frame varies, and therefore, amount of data stored in ES 104 varies. When stuffing occurs, the clock conversion unit 100 absorbs variation of the amount of data stored in ES 104 by advancing or retarding the phase of read clock RCLK.

Phase control of read clock RCLK is carried out by controlling the generated frequency of the voltage control oscillator 200 that generates the second clock, and thereby changing the phase of the second clock. The construction and operation of the circuit that controls the generated frequency of the voltage control oscillator 200 will be described below.

The clock divider 110 divides the first clock. The phase shifter 111 outputs ten different clock signals by imparting phase shift of 36°×i, respectively, to the divided clock of the first clock, where i is an integer 0 to 9. Thus, the phase shifter 111 outputs ten clock signals by imparting phase shift in 10 steps with step width of 36° to the divided clock of the first clock.

FIG. 2 is a time chart depicting the clock signal outputted from the phase shifter 111. The signals CLK1 to CLK9 represent the output clocks from the phase shifter 111 with phase shift of 36°×i (i is an integer of 0 to 9), respectively, imparted to the divided clock of the first clock.

Referring to FIG. 1, SEL 112 selects one of clock signals CLK1 to CLK9 in accordance with the selection instructing signal outputted from the decoder 115, and outputs it to the phase comparator 117. In description of the construction of FIG. 1, the clock signal selected by SEL 112 may be denoted as "the third clock".

The counter 113 receives a positive stuffing signal and a negative stuffing signal notifying occurrence of a positive stuffing and a negative stuffing as input EN(−) and EN(+), respectively, and counts the number of occurrences of stuffing. The counter 113 decreases the count by one each time it receives input EN(−), and increases the count by one each time it receives input EN(+).

When the count exceeds an upper bound value, the counter 113 outputs a carry-out signal CO(+), and resets the count to 0. When the count falls short of a lower bound value, the counter 113 outputs a carry-out signal CO(−), and resets the count to 0.

The counter 114 receives the carry-out signals CO(+) and CO(−) as inputs EN(+) and EN(−), respectively, and counts the number of times of carry-out signal reception. When the counter 114 receives a carry-out signal CO(+), it increases the count by one, and when the counter 114 receives a carry-out signal CO(−), it decreases the count by one.

When the count is less than 0, the counter 114 changes the count to 9. When the count exceeds 9, the counter 114 changes the count to 0. The counter 114 outputs the count Q to the decoder 115.

The decoder 115 generates a selection instructing signal for SEL 112 in accordance with the count Q. For example, the decoder 115 generates a selection instructing signal indicating the count Q (Q=0 to 9). SEL 112 outputs a clock obtained by imparting a phase shift of 36°×Q to the divided clock of the first clock as the third clock to the phase comparator 117.

Thus, if the upper bound value and the lower bound value of the count of the counter 113 are "k" and "−k", respectively, the phase of the third clock inputted to the phase comparator 117 is advanced by 36° each time the count exceeds "k". The phase of the third clock inputted to the phase comparator 117 is retarded by 36° each time the count falls short of "−k".

The phase comparator 117 compares phase difference between the third clock outputted from SEL 112 and the divided clock CLKR obtained by dividing the second clock by the clock divider 116. A low-pass filter 201 generates a voltage signal in accordance with the phase difference detected by the phase comparator 117, and outputs the voltage signal to the voltage control oscillator 200. In the description that follows, a low-pass filter may be denoted as "LPF".

The voltage control oscillator 200 controls the frequency of the second clock so as to maintain a prescribed phase relation between the phase of the third clock and the phase of the divided clock CLKR. Thus, when SEL 112 advances the phase of the third clock, the voltage control oscillator increases the frequency of the second clock such that the phase of the divided clock CLKR can follow the phase of the third clock. On the other hand, when SEL 112 retards the phase of the third clock, the voltage control oscillator 200 decreases the frequency of the second clock such that the phase of the divided clock CLKR can follow the phase of the third clock.

Phase control of the second clock by the voltage control oscillator 200 will be described below. FIG. 3A to FIG. 3C are views illustrating the frequency control of the second clock in the clock conversion unit 100. FIG. 3A depicts a state in which the clock CLK1 as depicted in FIG. 2 has been selected by SEL 112 and synchronization of the CLK1 with the divided clock CLKR of the second clock has been established.

FIG. 3B depicts a state in which SEL 112 selects the clock CLK2, and as a result, the phase of the clock outputted from SEL 112 is advanced. Immediately after CLK" is selected, synchronization of the divided clock CLKR of the second clock with CLK2 is temporarily broken.

FIG. 3C depicts a state in which certain time has elapsed after FIG. 3B and synchronization of the divided clock CLKR of the second clock with CLK2 has been established. The voltage control oscillator 200 increases the frequency of the second clock since synchronization was broken as in FIG. 3B until synchronization is established again by advancing the phase of the divided clock CLKR of the second clock.

Thus, when negative stuffing occurs and an amount of data stored in ES 104 increases, the phase of the third clock is advanced. As a result, the voltage control oscillator 200 performs frequency control for increasing the frequency of the second clock to thereby advance read-out clock RCLK of ES 104 and to decrease the amount of data stored in ES 104.

On the contrary, when positive stuffing occurs and amount of data stored in ES 104 decreases, the phase of the third clock is retarded. As a result, the voltage control oscillator 200 performs frequency control for decreasing the frequency of the second clock to thereby retard read-out clock RCLK of ES 104 and to increase the amount of data stored in ES 104.

SDH (Synchronous Digital Hierarchy) transmission apparatus has been proposed in which an internal reference frame timing generated in a main signal processing unit containing a plurality of interface units is distributed to each interface unit by a frame timing distribution unit. In the above SDH transmission apparatus, by suppressing variation of the shift of the frame top position of each main signal from each interface unit to a minimum, change of frame timing of main signal can be achieved with minimum memory capacity without using pointer processing technology. In this way, size of the apparatus can be reduced to minimum, even if number of processing channels is increased.

Related art is disclosed in International Publication Pamphlet No. WO2000/074283.

SUMMARY

In accordance with an aspect of the apparatus, a clock conversion apparatus is provided. The clock conversion apparatus includes an elastic store memory in which data are written in synchronization with a first clock and from which data are read out in synchronization with a second clock, a phase comparator for detecting phase difference between a third clock obtained by imparting a first variable phase shift to a divided clock of the first clock and a fourth clock obtained by imparting a second variable phase shift to a divided clock of the second clock, and an oscillator for generating a clock having frequency in accordance with the phase difference as the second clock.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 2 is a time chart depicting the clock outputted from a phase shifter.

FIG. 4 is a schematic view depicting the construction of a communication network.

FIG. 10 is a view illustrating an example of decoding performed by the second decoder of FIG. 6.

FIG. 16 is a view illustrating an example of decoding performed by the first decoder of FIG. 15.

FIG. 17 is a view illustrating an example of decoding performed by the second decoder of FIG. 15.

DESCRIPTION OF EMBODIMENTS

Figure 1:
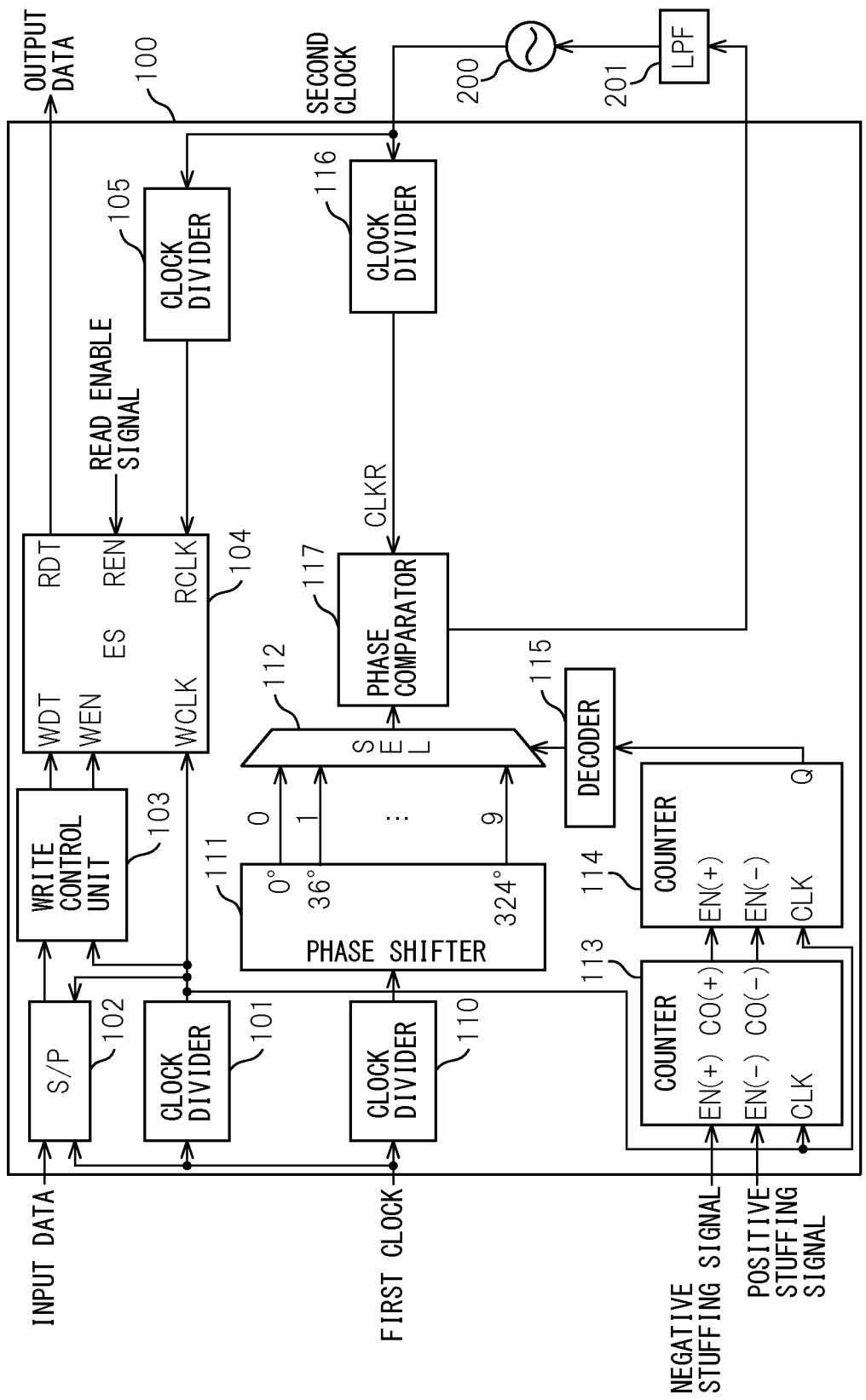
FIG. 1 is a view depicting the construction of an example of clock conversion unit.
Figure 3A:
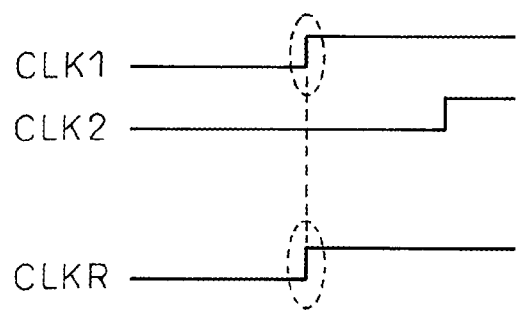
FIG. 3A is a view illustrating the control of the second clock in the clock conversion unit of FIG. 1.
Figure 3B:
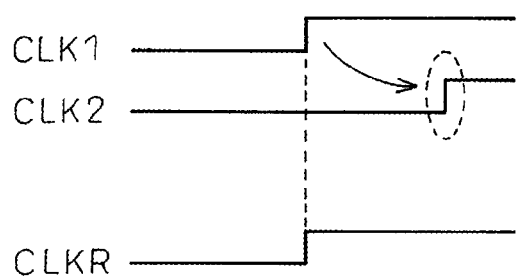
FIG. 3B is a view illustrating the control of the second clock in the clock conversion unit of FIG. 1.
Figure 3C:
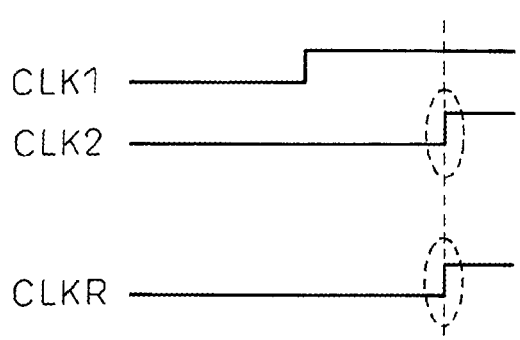
FIG. 3C is a view illustrating the control of the second clock in the clock conversion unit of FIG. 1.

In the above clock conversion unit, capacity required for ES 104 depends on the number of times of occurrence of stuffing to be waited until phase control of the second clock is executed once. That is, the required capacity of ES 104 depends on fineness of the step width of phase changed in one phase control of the second clock. In other words, required capacity of ES 104 depends on fineness, i.e., granularity, of phase control of the second clock.

In the exemplary construction as described above, granularity of phase control of the second clock is determined in accordance with the number of steps of phase shift that can be imparted by the phase shifter 111. On the other hand, when the clock conversion unit 100 is realized as ASIC (Application Specific Integrated Circuit), a circuit provided in the ASIC beforehand is often used as the phase shifter 111.

Since the number of steps of phase shift of this phase shifter 111 is determined by the vendor of the ASIC, it is difficult for a user to determine the number freely in accordance with the required capacity of ES 104. Therefore, a user has been unable to freely select the granularity of phase control of the second clock.

It is an object of the apparatus and method discussed herein, in a clock conversion apparatus comprising an elastic store memory for writing data in synchronization with a first clock and reading out data in synchronization with a second clock, to provide a novel method for phase control of the second clock. It is an object of the apparatus and method according to the present embodiment, in the case where the phase of the second clock is controlled based on the phase difference between the divided clock of the first clock and the divided clock of the second clock, to increase the degree of freedom in determining the granularity of phase control of the second Preferred embodiments of the present invention will be described below with reference to appended drawings. FIG. 4 is a schematic view depicting the construction of a communication network. The communication network 1 includes long haul networks 10 and 11, a metro network 20, and access networks 30 to 32. Reference numerals 12 to 19 denote transmission apparatuses transmitting frames in the long haul network 10, and reference numerals 21 to 24 denote transmission apparatuses transmitting frames in the metro network 20.

Figure 5:
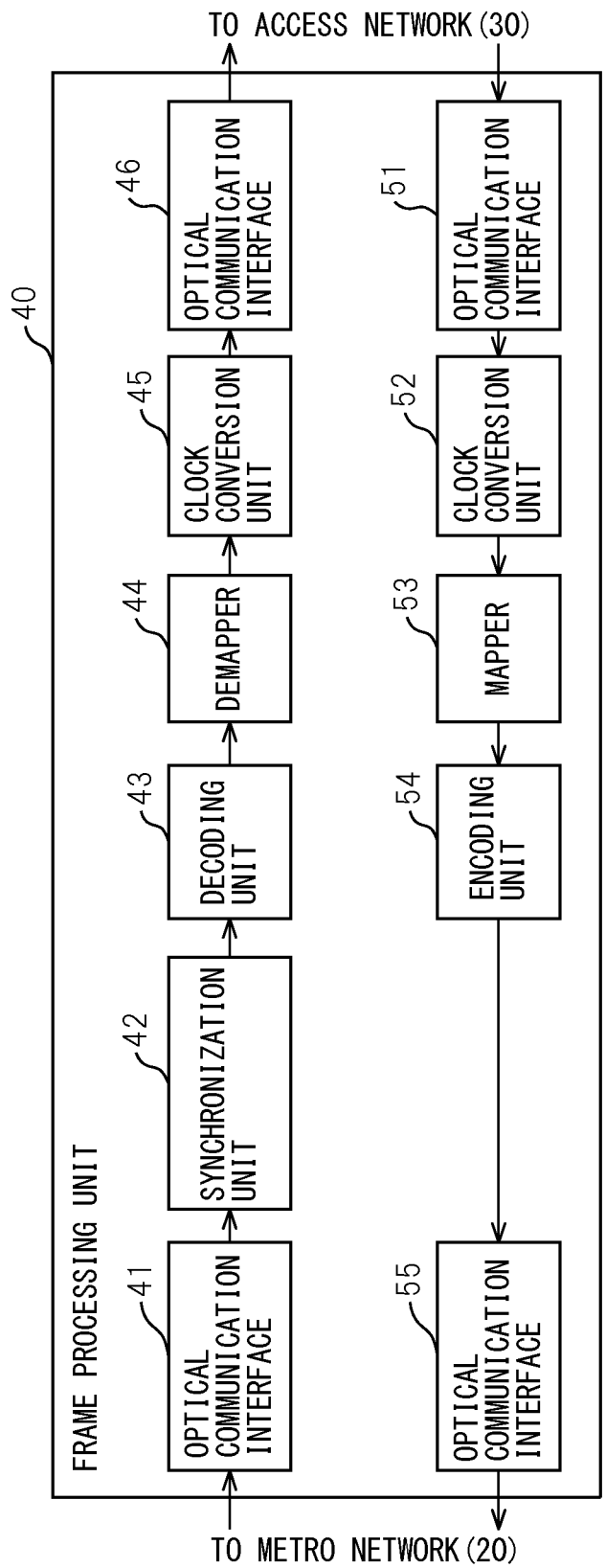
FIG. 5 is a view depicting the construction of an example of a frame processing unit.

Each of the transmission apparatuses 12 to 19 and 21 to 24 comprises a frame processing unit for demapping the received frames and reading out the payload. FIG. 5 is a view depicting the construction of an example of a frame processing unit. The frame processing unit 40 of FIG. 5 is provided in a transmission apparatus 21 that connects the metro network 20 to access networks 30 to 32.

In the transmission apparatus 21, the frame processing unit 40 executes frame conversion between OTN frames transmitted over the metro network 20 and STS (Synchronous Transport Signal) frame transmitted over the access networks 30 to 32.

The frame processing unit 40 comprises optical communication interfaces 41, 46, 51 and 55, a synchronization unit 42, a decoding unit 43, a demapper 44, a clock conversion units 45 and 52, a mapper 53, and an encoding unit 54.

The optical communication interface 41 receives OTN frames transmitted over the metro network 20, and converts OTN frames to electric signal in parallel format. The synchronization unit 42 detects synchronization of OTN frame converted into electric signal. The decoding unit 43 performs decoding of OTN frames.

The demapper 44 executes demapping of OTN frame, and detects range of valid data occupied by the payload in OTN frame and stuffing instruction bits instructed in OTN frame. The demapper 44 inputs the instruction information indicating the range of valid data occupied by the payload in OTN frame and positive stuffing signal and negative stuffing signal indicating the content of the stuffing instruction bits to the clock conversion unit 45.

The clock conversion unit 45 converts data stored in OTN frame in synchronization with the reception clock extracted from the received OTN frame into data in synchronization with the internal clock in the transmission apparatus 21. In the description that follows, the reception clock may be denoted as "the first clock" and the internal clock may be denoted as "the second clock".

The optical communication interface 46 converts STS frame from the payload of OTN frame to optical signal by the clock conversion unit 45, and transmits them to the access network 30.

On the other hand, the optical communication interface 51 receives STS frame transmitted over the access network 30, and converts STS frame into electric signal in parallel format. The clock conversion unit 52 converts the clock of STS frame.

The mapper 53 generates OTN frame and stores STS frame into the payload of OTN frame. The encoding unit 54 encodes OTN frame. The optical communication interface 55 converts OTN frame to optical signal and transmits it to the metro network 20.

The frame processing unit 40 depicted in FIG. 5 is only an example, and the frame processing unit according to the embodiment described in the present specification is not limited to the frame processing unit depicted in FIG. 5. The frame processing unit described in the present specification may be applied to any unit as long as it receives frames in which stuffing may occur and comprises an elastic store memory for converting the received frame in synchronization with the reception clock to data in synchronization with an internal clock.

Figure 6:
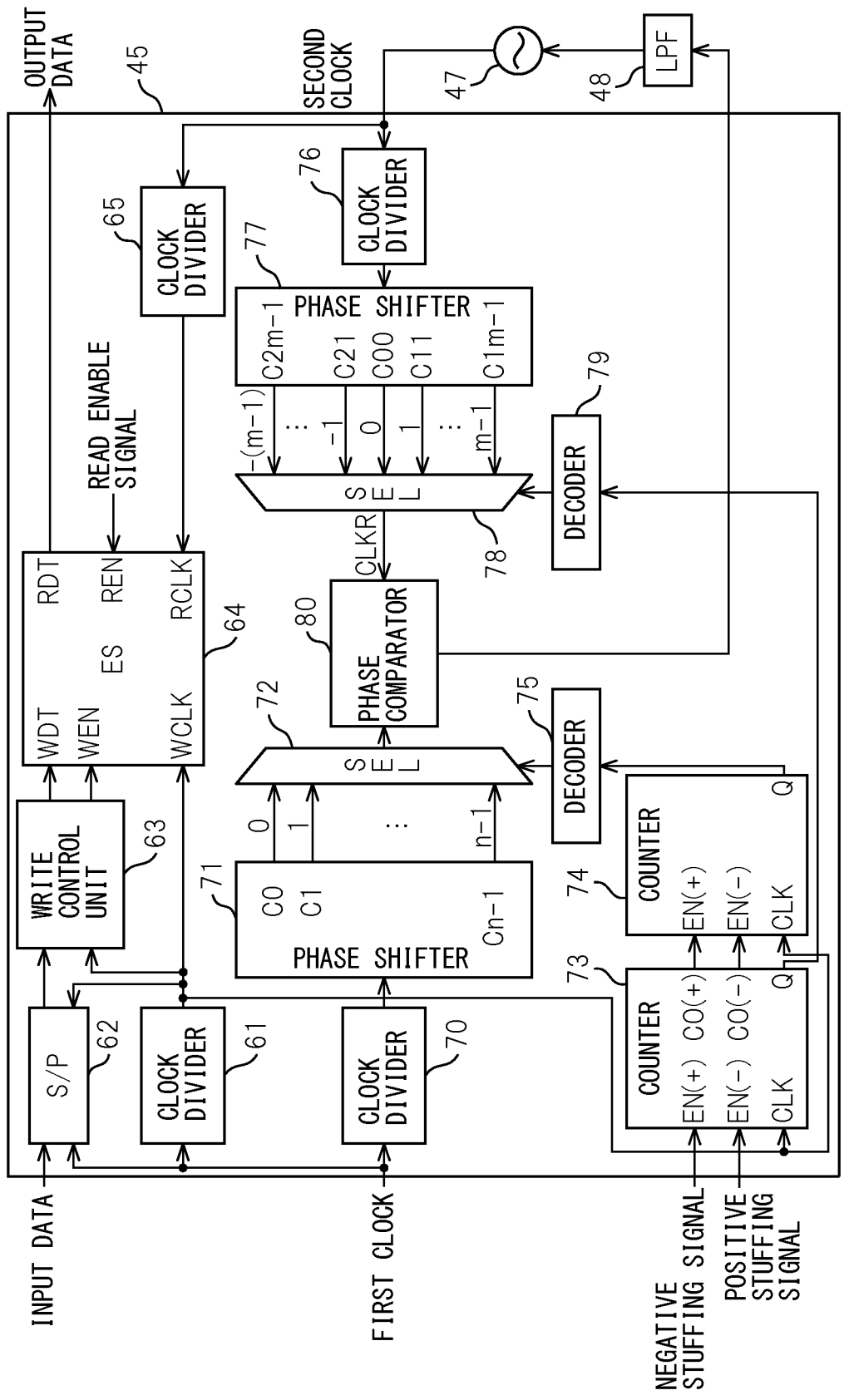
FIG. 6 is a view depicting the construction of a first example of a clock conversion unit.

FIG. 6 is a view depicting the construction of a first example of the clock conversion unit 45. The clock conversion unit 45 comprises clock dividers 61, 65, 70, 76, and S/P 62, a write control unit 63, and ES 64. The clock conversion unit 45 also comprises a first phase shifter 71, a first SEL 72, a first counter 73 and a second counter 74, and a first decoder 75.

The clock conversion unit 45 also comprises a second phase shifter 77, a second SEL 78, a second decoder 79, and a phase comparator 80.

The clock divider 61 divides the first clock in a prescribed division ratio. The clock divider 61 inputs the divided clock of the first clock to S/P 62, the write control unit 63, ES 64, and to the first counter 73 and the second counter 74. S/P 62 receives data included in the received frame as input data, and converts the data to parallel data of prescribed bit width. The parallel data are inputted to the write control unit 63.

The write control unit 63 selects valid data in the input data in accordance with the instruction information received from the demapper 44, and outputs the valid data to the write data bus WDT of ES 64. While outputting the valid data, the write control unit 63 also outputs write enable signal WEN to ES 64. The divided clock is inputted from the clock divider 61 to ES 64 as write clock WCLK.

The clock divider 65 divides the second clock generated by the voltage control oscillator 47. The clock divider 65 divides the second clock. The divided clock of the second clock is inputted to ES 64 as read-out clock RCLK. The input data stored in ES 64 are read out in the timing in synchronization with the second clock in accordance with the read enable signal REN.

The clock divider 70 divides the first clock. The first phase shifter 71 outputs n clock signals C0 to Cn−1 obtained by imparting phase shift of (360°/n)×i, respectively, to the divided clock of the first clock, where n is a natural number, and i is an integer from 0 to (n−1). Thus, the first phase shifter 71 outputs n clock signals by imparting phase shift in n steps with step width of (360°/n) to the divided clock of the first clock.

Figure 7:
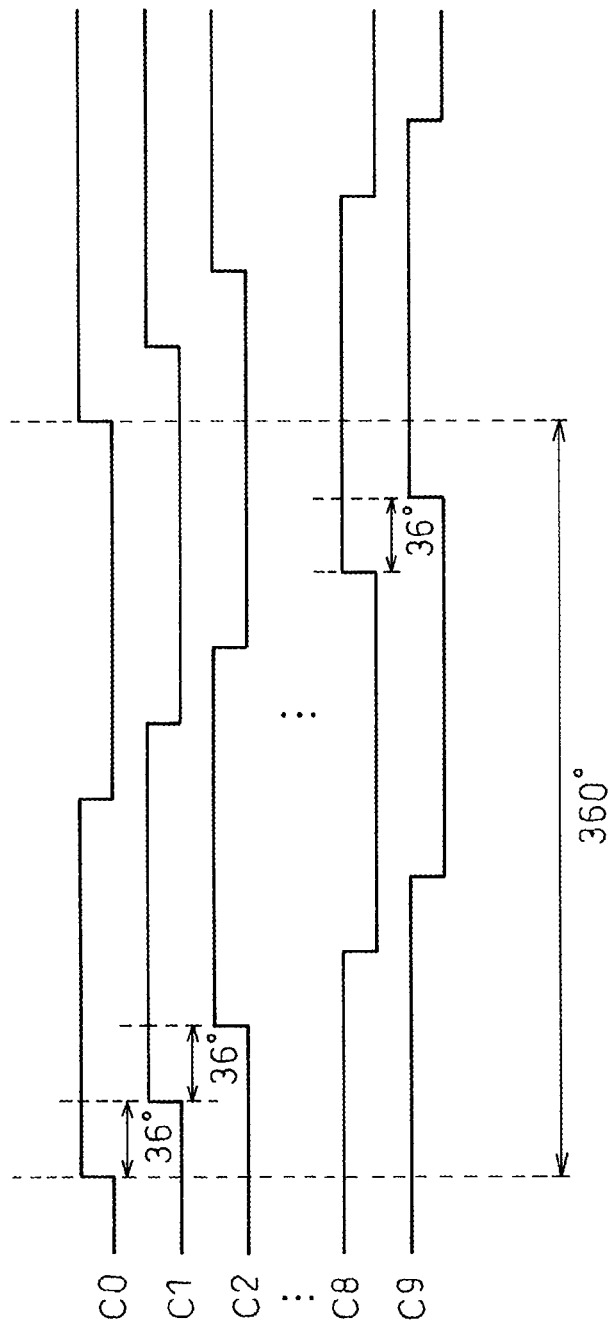
FIG. 7 is a time chart depicting the clock outputted from the first phase shifter.

FIG. 7 is a time chart of the clock signals C0 to Cn−1 outputted from the first phase shifter 71. FIG. 7 depicts an exemplary case of n=10, but n may be any other value. Clock signals C1 to C9 are clocks obtained by imparting phase shift of 36°×i (i is an integer 0 to 9), respectively, to the divided clock of the first clock.

Referring to FIG. 6, the first SEL 72 selects, in accordance with selection instructing signal outputted by the first decoder 75, one of n clock signals C0 to Cn−1 and outputs it to the phase comparator 80. In the description that follows, the clock signal selected by the first SEL 72 may be denoted as "the third clock".

The clock divider 76 divides the second clock. The frequency of the divided clock obtained by dividing the first clock by the clock divider 70 is equal to the frequency of the divided clock of the second clock obtained by dividing the second clock by the clock divider 76.

The second phase shifter 77 outputs (2m−1) clock signals C2m−1, . . . , C21, C00, C1, . . . , C1m−1 obtained by imparting phase shift of (360°/(n×m))×j, respectively, to the divided clock of the second clock, where m is a natural number, and j is an integer −(m−1) to (m−1).

Thus, the second phase shifter 77 outputs (2m−1) clock signals obtained by imparting phase shifts at (2m−1) steps with step width of (360°/(n×m)).

Figure 8:
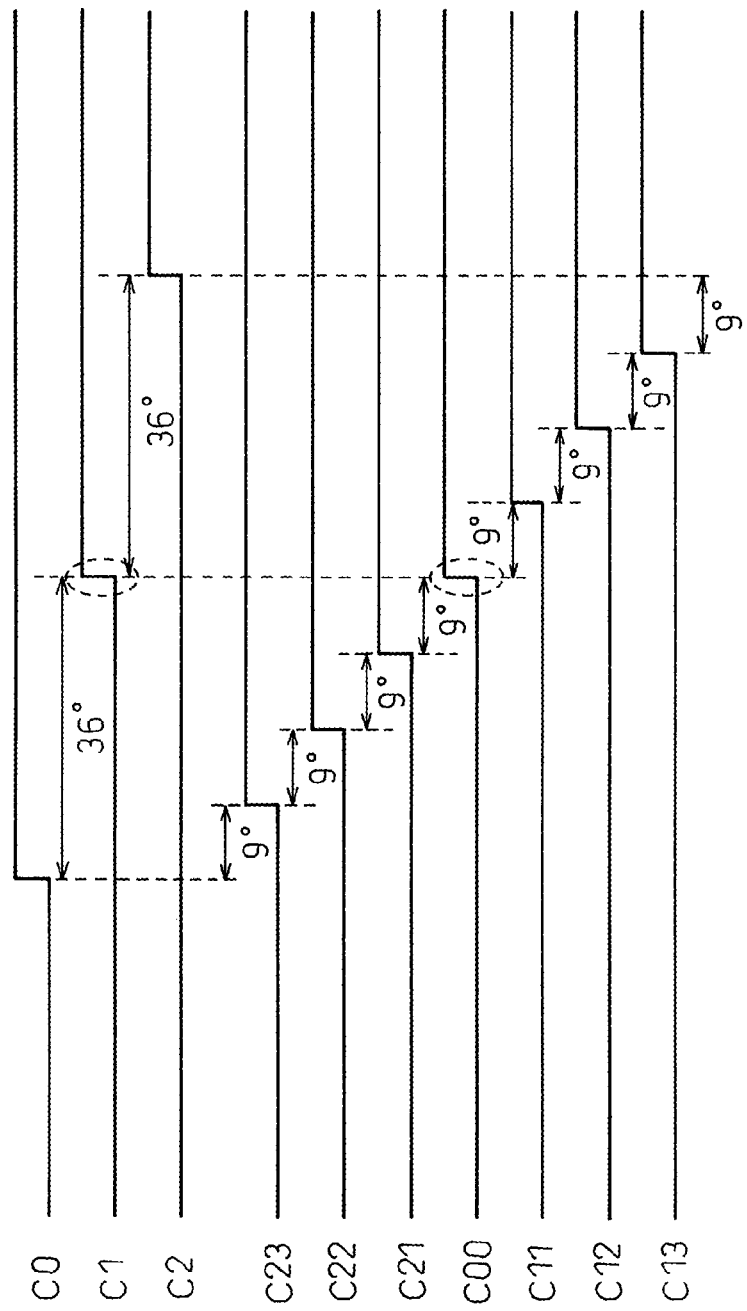
FIG. 8 is a time chart depicting the clock outputted from the second phase shifter.

FIG. 8 is a time chart of the clock outputted by the second phase shifter 77. FIG. 8 depicts an exemplary case of m=4, but m may be any other value. The clock signals C21 to C23 are clocks obtained by imparting phase shifts of (−9°)×j, respectively, to the divided clock of the second clock, where j is an integer 1 to 3.

Clock signals C11 to C13 are clocks obtained by imparting phase shifts of 9°×j, respectively, to the divided clock of the second clock. Clock signal C00 is a signal in phase with the divided clock of the second clock.

As illustrated, each phase difference between clock signals C23 to C21, C00, C11 to C13 is 9°, which is 1/m, that is, ¼, of phase difference 36° between clock signals C0 to C9. Therefore, if, for example, C00 is in phase with clock signal C1, clock C23 is advanced by 9°, that is, by (360°/(n×m)).

Referring to FIG. 6, in accordance with the selection instructing signal outputted from the second decoder 79, the second SEL 78 selects one of (2m−1) clock signals and outputs it to the phase comparator 80. In the description that follows, clock signal selected by the second SEL 78 may be denoted as "the fourth clock".

The first counter 73 receives positive stuffing signal and negative stuffing signal outputted from the demapper 44 as inputs EN(−) and EN(+), respectively, and counts the stuffing that have occurred. The counter 73 decreases the count by one each time it receives input EN(−), and increases the count by one each time it receives input EN(+). The counter 73 outputs the count Q to the second decoder 79.

When the count of stuffing exceeds the upper bound value "k", the first counter 73 outputs carryout signal CO(+) and resets the count to 0. When the count of stuffing falls short of the lower bound value "−k", the first counter 73 outputs carryout signal CO(−) and resets the count to 0.

The second counter 74 receives carryout signals CO(+) and C(−) as inputs EN(+) and EN(−), respectively, and counts number of times of reception of the carryout signal. The second counter 74 increases the counts by one each time it receives carryout signal CO(+), and decreases the counts by one each time it receives carryout signal CO(−).

When the count falls short of "0", the second counter 74 changes the count to "n−1". When the count exceeds "n−1", the second counter 74 changes the count to "0". The second counter 74 outputs the count Q to the first decoder 75.

Figure 9:
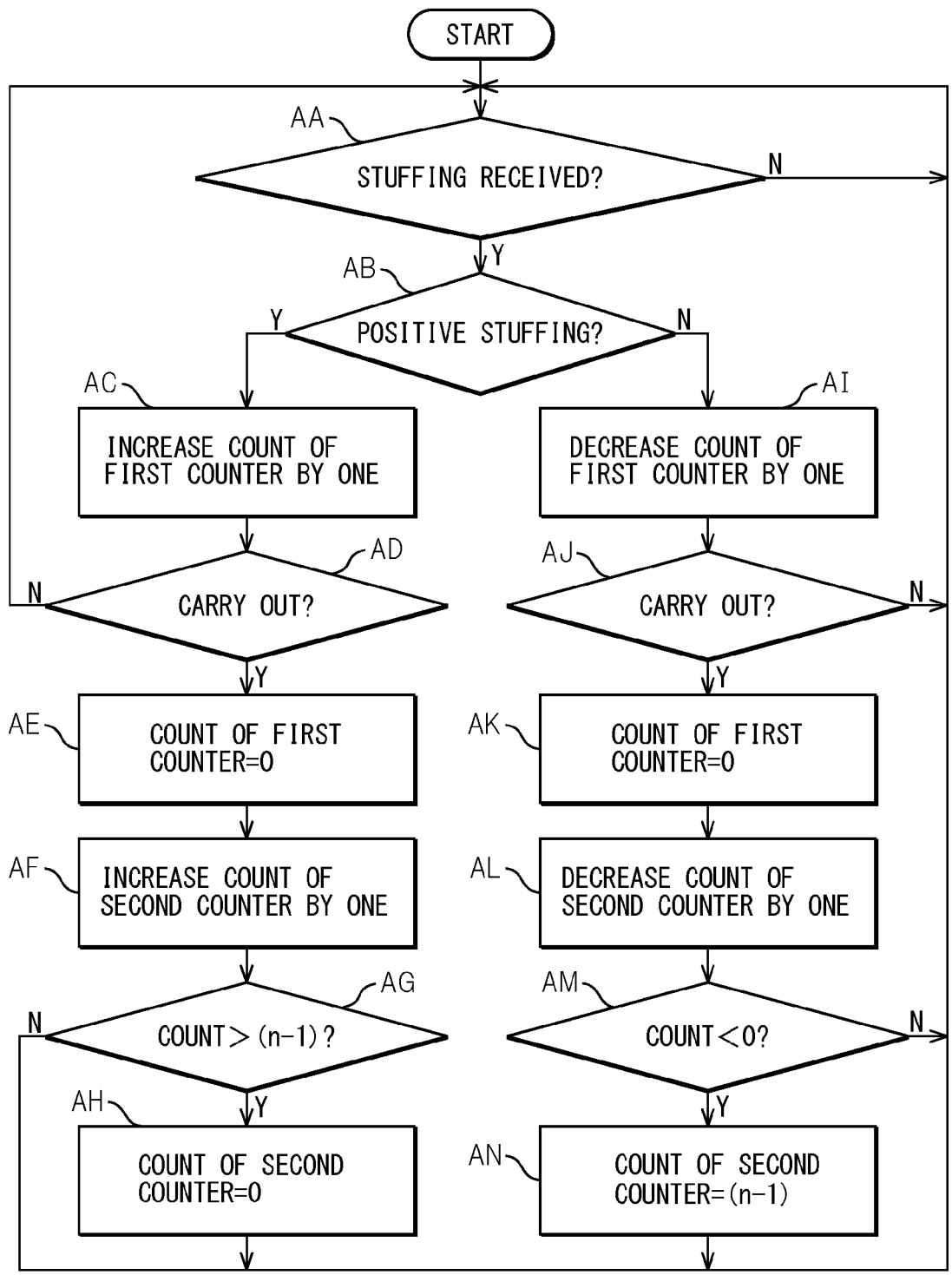
FIG. 9 is a view illustrating the operation of the first counter and the second counter.

FIG. 9 is a view illustrating the operation of the first counter 73 and the second counter 74. Each of the following operations AA to AN may be a step. In operation AA, the first counter 73 determines whether or not a positive stuffing signal or a negative stuffing signal has been received. If a positive stuffing signal or a negative stuffing signal has been received (operation AA: Y), the processing proceeds to operation AB. Neither positive stuffing signal nor negative stuffing signal has been received (operation AA: N), the processing returns to operation AA.

In operation AB, the first counter 73 determines whether or not a positive stuffing signal has been received. If a positive stuffing signal has been received (operation AB: Y), the processing proceeds to operation AC. If a negative stuffing signal has been received (operation AB: N), the processing proceeds to operation AI.

In operation AC, the first counter 73 increases the count by one. In operation AD, the first counter 73 determines whether or not a carryout signal CO(+) has to be generated, i.e., the count exceeds the upper bound value "k". If the first counter 73 has to generate a carryout signal CO(+) (operation AD: Y), the processing proceeds to operation AE. If the first counter 73 needs not generate a carryout signal CO(+) (operation AD: N), the processing returns to operation AA.

In operation AE, the first counter 73 resets the count to "0" and outputs a carryout signal CO(+) to the second counter 74. In operation AF, the second counter 74 increases the count by one.

In operation AG, the second counter 74 determines whether or not the count exceeds "n−1". If the count exceeds "n−1" (operation AG: Y), the processing proceeds to operation AH. If the count does not exceed "n−1" (operation AG: N), the processing returns to operation AA.

In operation AH, the second counter 74 resets the count to "0", and thereafter, the processing returns to operation AA.

On the other hand, in operation AI, the first counter 73 decreases the count by one. In operation AJ, the first counter 73 determines whether or not a carryout signal CO(−) has to be generated, i.e., whether or not the count falls short of the lower bound value "−k". If the first counter 73 has to generate a carryout signal CO(−) (operation AJ: Y), the processing proceeds to operation AK. If the first counter 73 needs not generate a carryout signal CO(−) (operation AJ: N), the processing returns to operation AA.

In operation AK, the first counter 73 resets the count to "0", and outputs a carryout signal CO(−) to the second counter 74. In operation AL, the second counter 74 decreases the count by one.

In operation AM, the second counter 74 determines whether or not the count falls short of "0". If the count falls short of "0" (operation AM: Y), the processing proceeds to operation AN. If the count does not fall short of "0" (operation AM: N), the processing returns to operation AA.

In operation AN, the second counter 74 changes the count to "n−1". Thereafter, the processing returns to operation AA.

Referring to FIG. 6, the first decoder 75 generates a selection instructing signal for the first SEL 72 in accordance with the count Q of the second counter 74. For example, the first decoder 75 generates a selection instructing signal indicating the count Q (Q=0 to (n−1)). When the selection instructing signal indicating the count Q (Q=0 to (n−1)) is received, the first SEL 72 selects clock signal C0 to Cn−1, respectively, and outputs it to the phase comparator 80.

Therefore, each time the count of stuffing by the first counter 73 exceeds the upper bound value "k", phase of the third clock outputted by the first SEL 72 is advanced by 360°/n. Also, each time the count of stuffing by the first counter 73 falls short of the lower bound value "−k", phase of the third clock outputted by the first SEL 72 is retarded by 360°/n.

The second decoder 79 generates a selection instructing signal for the second SEL 78 in accordance with the count Q of the first counter. The second decoder 79 determines the value of the selection instructing signal such that, as the count Q of the first counter 73 varies "0" to "k", the value of the selection instructing signal varies stepwise "0" to "m−1". Also, the second decoder 79 determines the value of the selection instructing signal such that, as the count Q of the first counter 73 varies "0" to "−k", the value of the selection instructing signal varies stepwise "0" to "−(m−1)".

FIG. 10 is a view illustrating an example of decoding executed by the second decoder 79 of FIG. 6. In the example of FIG. 10, m="4", and the value "k" of the upper bound of the count Q of the first counter 73 is "16", and the value "−k" of the lower bound is "−16". Values of "m", "k" and "−k" may be other values.

When the value of the count Q of the first counter 73 is "−16" to "−12", the second decoder 79 outputs a selection instructing signal having the value "−3". When the value of the count Q of the first counter 73 is "−11" to "−8", the second decoder 79 outputs a selection instructing signal having the value "−2".

Also, when the value of the count Q of the first counter 73 is "−7" to "−4", the second decoder 79 outputs a selection instructing signal having the value "−1". When the value of the count Q of the first counter 73 is "−3" to "3", the second decoder 79 outputs a selection instructing signal having the value "0".

When the value of the count Q of the first counter 73 is "4" to "7", the second decoder 79 outputs a selection instructing signal having the value "1". When the value of the count Q of the first counter 73 is "8" to "11", the second decoder 79 outputs a selection instructing signal having the value "2". When the value of the count Q of the first counter 73 is "12" to "16", the second decoder 79 outputs a selection instructing signal having the value "3".

Referring to FIG. 6, when a selection instructing signal "−(m−1)" to "−1", "0", "1" to "m−1" is received, the second SEL 72 selects clock signal C2m−1 to C21, C00, C11 to C1m−1, respectively, and outputs it to the phase comparator 80. For example, in the example of the selection instructing signal depicted in FIG. 10, when a selection instructing signal having the value "−3" to "−1", "0", "1" to "3" is received, the second SEL 72 selects clock signal C23 to C21, C00, C11 to C13, respectively, and outputs it to the phase comparator 80.

Thus, as the count of stuffing of the first counter 73 varies from "0" to "k", phase of the fourth clock outputted from the second SEL 78 varies in step width of 360°/(n×m) from "0" to (360°/(n×m))×(m−1). Also, as the count of stuffing of the first counter 73 varies from "0" to "−k", phase of the fourth clock outputted from the second SEL 78 varies in step width of 360°/(n×m) from "0" to −(360°/(n×m))×(m−1).

The phase comparator 80 compares phase difference between the third clock outputted from the first SEL 72 and the fourth clock outputted from the second SEL 78. LPF 48 generates a voltage signal in accordance with the phase difference detected by the phase comparator 80, and outputs it to the voltage control oscillator 47.

The voltage control oscillator 47 controls the frequency of the second clock such that a prescribed phase relation is maintained between the phase of the third clock and the phase of the fourth clock. Therefore, if the first SEL 72 advances the phase of the third clock, the voltage control oscillator 47 increases the frequency of the second clock to advance the phase of the second clock in order to force the phase of the fourth clock to follow the phase of the third clock. On the other hand, if the first SEL 72 retards the phase of the third clock, the voltage control oscillator 47 decreases the frequency of the second clock to retard the phase of the second clock in order to force the phase of the fourth clock to follow the phase of the third clock.

Also, if the second SEL 79 advances the phase of the fourth clock, the voltage control oscillator 47 decreases the frequency of the second clock to retard the phase of the second clock in order to restore the original phase of the fourth clock. On the other hand, if the second SEL 79 retards the phase of the fourth clock, the voltage control oscillator 47 increases the frequency of the second clock to advance the phase of the second clock in order to restore the original phase of the fourth clock.

The step width of phase change of the third clock outputted from the first SEL 72 is (360°/n), and the range of phase change is 0 to (360°/n)×(n−1). On the other hand, the step width of phase change of the fourth clock outputted from the second SEL 78 is (360°/(n×m)), and the range of phase change is (360°/(n×m))×(−(m−1)) to (360°/(n×m))×(m−1).

Therefore, the clock conversion unit 45 can change the phase of the third clock and the fourth clock in accordance with the count of stuffing, to thereby control the phase of the second clock in step width of (360°/(n×m)) over the entire 360°.

Next, referring to FIG. 11A to FIG. 11C, FIG. 12A to FIG. 12C, and FIG. 13A to FIG. 13C, control of the phase of the third clock and the phase of the fourth clock in phase control of the second clock described above will be illustrated.

In the description that follows, the case where the first phase shifter 71 outputs clock signals C0 to C9 as depicted in FIG. 7, and the second phase shifter 77 outputs clock signals C23 to C21, C00, C11 to C 13 will be illustrated. Also, the case where decoding by the second decoder 79 follows the processing as depicted in FIG. 10 will be illustrated.

Figure 11A:
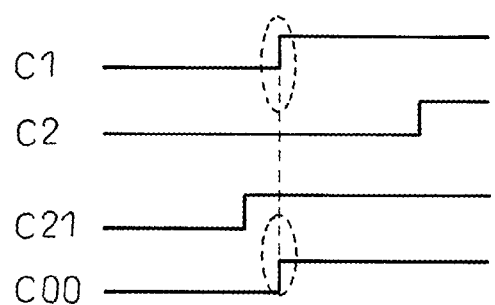
FIG. 11A is a view illustrating the control of the second clock.

FIG. 11A depicts a state in which the clock C1 is selected by the first SEL 72, the clock C00 is selected by the second SEL 78, and synchronization of the third clock C1 with the fourth clock C00 is established.

Figure 11B:
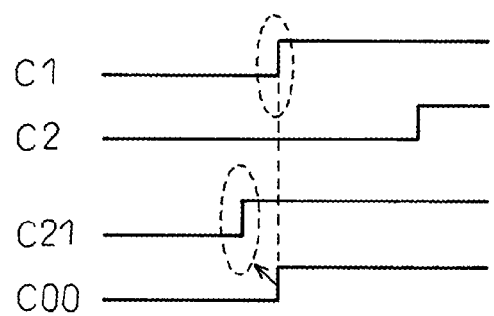
FIG. 11B is a view illustrating the control of the second clock.

When the first counter 73 receives positive stuffing signal four times, the second SEL 78 selects the clock C21. This state is depicted in FIG. 11B. As a result, the phase of the fourth clock is retarded by 9°, and synchronization of the third clock C1 with the fourth clock C21 is temporarily destructed.

Figure 11C:
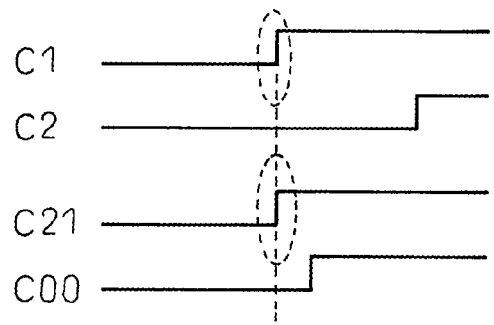
FIG. 11C is a view illustrating the control of the second clock.

Then, the voltage control oscillator 47 increases the frequency of the second clock, and advances the phase of the fourth clock C21 to the phase of the original C00. FIG. 11C depicts a state in which the phase of the fourth clock is advanced and synchronization of the third clock C1 with the fourth clock C21 is established. As a result, the phase of the second clock is advanced by 9°.

Figure 12A:
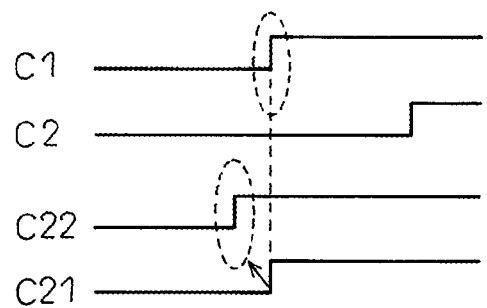
FIG. 12A is a view illustrating the control of the second clock.

Thereafter, when the first counter 73 receives positive stuffing signal four times, the second SEL 78 selects the clock C22. FIG. 12A depicts this state. As a result, the phase of the fourth clock is retarded by 9°, and synchronization of the third clock C1 with the fourth clock C22 is temporarily destructed.

Figure 12B:
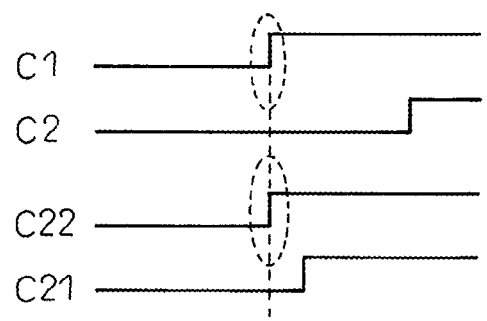
FIG. 12B is a view illustrating the control of the second clock.

The voltage control oscillator 47 increases the frequency of the second clock and advances the phase of the fourth clock C22 to the phase of the original clock C21. A state in which the phase of the fourth clock is advanced and synchronization of the third clock C1 with the fourth clock C22 has been established is depicted in FIG. 12B. As a result, phase of the second clock is advanced by 9°.

Figure 12C:
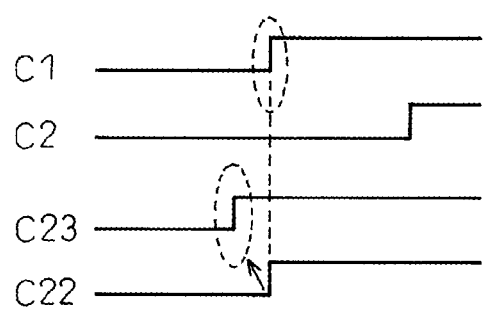
FIG. 12C is a view illustrating the control of the second clock.

Thereafter, when the first counter 73 receives positive stuffing signal four times, the second SEL 78 selects the clock C23. FIG. 12C depicts this state. As a result, the phase of the fourth clock is retarded by 9°, and synchronization of the third clock C1 with the fourth clock C23 is temporarily destructed.

Figure 13A:
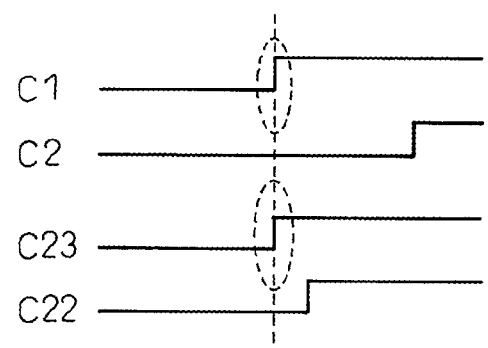
FIG. 13A is a view illustrating the control of the second clock.

The voltage control oscillator 47 increases the frequency of the second clock and advances the phase of the fourth clock C23 to the phase of the original clock C22. A state in which the phase of the fourth clock is advanced and synchronization of the third clock C1 with the fourth clock C23 has been established is depicted in FIG. 13A. As a result, phase of the second clock is advanced by 9°.

Figure 13B:
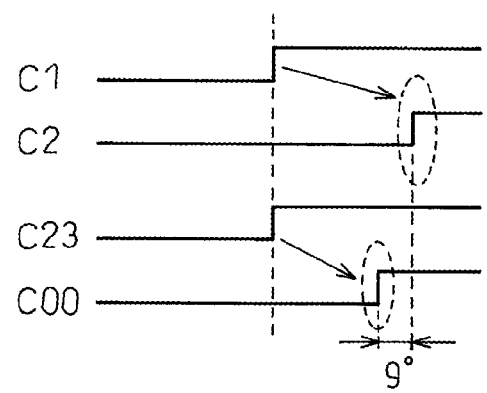
FIG. 13B is a view illustrating the control of the second clock.

Thereafter, when the first counter 73 receives positive stuffing signal five times, the count of the first counter 73 is reset to "0", and the first counter 73 outputs a carryout signal CO(+), whereupon the first SEL 78 selects the clock C2, and the second SEL 78 selects the clock C again. This state is depicted in FIG. 13B.

Figure 13C:
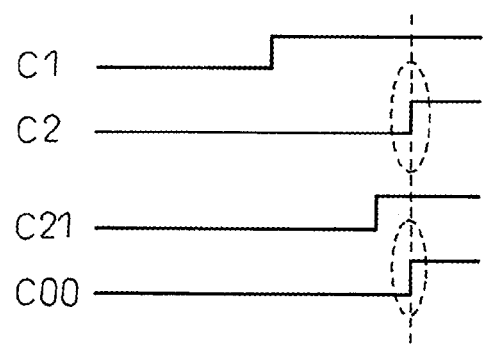
FIG. 13C is a view illustrating the control of the second clock.

At this time, the phase of the fourth clock C00 is retarded by 9° relative to the third clock C3. Therefore, the voltage control oscillator 47 increases the frequency of the second clock to advance the phase of the fourth clock C00 and to establish synchronization of the third clock C2 with the fourth clock C00. A state in which this synchronization is established is depicted in FIG. 13C. As a result, the phase of the second clock is advanced by 9°.

Thus, the clock conversion unit 45 can control the phase of the second clock in step width obtained by further dividing, into m parts, the step width of phase shift of the third clock obtained by dividing 360° into n parts.

FIG. 11A to FIG. 11C, FIG. 12A to FIG. 12C, and FIG. 13A to FIG. 13C depict an exemplary embodiment in which the third clock and the fourth clock are in phase with each other in a state the two clocks are in synchronization. However, the voltage control oscillator 47 needs only to control the second clock such that the two phases detected by the phase comparator 80 are in constant relation. In another exemplary embodiment, the third clock and the fourth clock may be in synchronization in a state in which the two clocks have a phase difference.

Examples of the frequency of clocks, division ration of clock dividers, bit width of data, data capacity of ES64, values of m, n, k are indicated below for an exemplary embodiment in which OTN frames are inputted.

(1) Frequency of the first clock: 669.3265823 MHz
(2) Frequency of the second clock: 622.08 MHz
(3) Division ratio of clock divider 61: 1/4
(4) Frequency of the divided clock outputted from the clock divider 61: 167.33 MHz
(5) Division ratio of clock divider 65: 1/4
(6) Frequency of the divided clock outputted from the clock divider 65: 155.52 MHz
(7) Division ratio of clock divider 70: 1/85
(8) Frequency of the divided clock outputted from the clock divider 70: 7.87443038 MHz
(9) Division ratio of clock divider 76: 1/79
(10) Frequency of the divided clock outputted from the clock divider 76: 7.87443038 MHz
(11) Bit width of input data to S/P62: 16 bits
(12) Bit width of read-out data from ES64: 64 bits
(13) n=10, m=4, k=16
(14) Capacity of ES64: 64 bits×10 words In this exemplary embodiment, the first phase shifter 71 and the second phase shifter 77 are provided for imparting phase shift respectively to the divided clock of the first clock and the divided clock of the second clock compared by the phase comparator 80. Thus, compared to the conventional construction in which a phase shifter is provided only for divided clock of the first clock, finer granularity can be realized in phase control for controlling the phase of the second clock.

Therefore, in accordance with this exemplary embodiment, the degree of freedom in determining the granularity of phase control for controlling the phase of the second clock can be increased. As a result, the degree of freedom in designing the capacity of ES 64 can be increased. Since, in accordance with this exemplary embodiment, the granularity of phase control for controlling the phase of the second clock is increased, capacity of ES 64 can be decreased.

Further, in this exemplary embodiment, when the number of steps of phase shift of the first phase shifter 71 is n, and the number of steps of phase shift of the second phase shifter 77 is (2×m−1), phase control of the second clock can be performed in m×n steps. On the other hand, if it is assumed that the divided clock of the first clock is inputted in parallel to the two phase shifters, and that n+(2×m−1) phase shifts are imparted only to the divided clock of the first clock, the number of steps of phase control of the second clock is n+(2×m−1).

For example, if the case where n=10, m=4 is assumed, the number of steps for the former and the number of steps for the latter are "40" and "17", respectively. Evidently, the larger m is, the larger is the difference between them. Thus, by providing a phase shifter to each of the divided clock of the first clock and the divided clock of the second clock, respectively, number of steps of phase control of the second clock can be increased as compared to the case where a phase shifter is provided to only one of these divided clocks. Capacity of ES 64 can be thereby saved.

Figure 14:
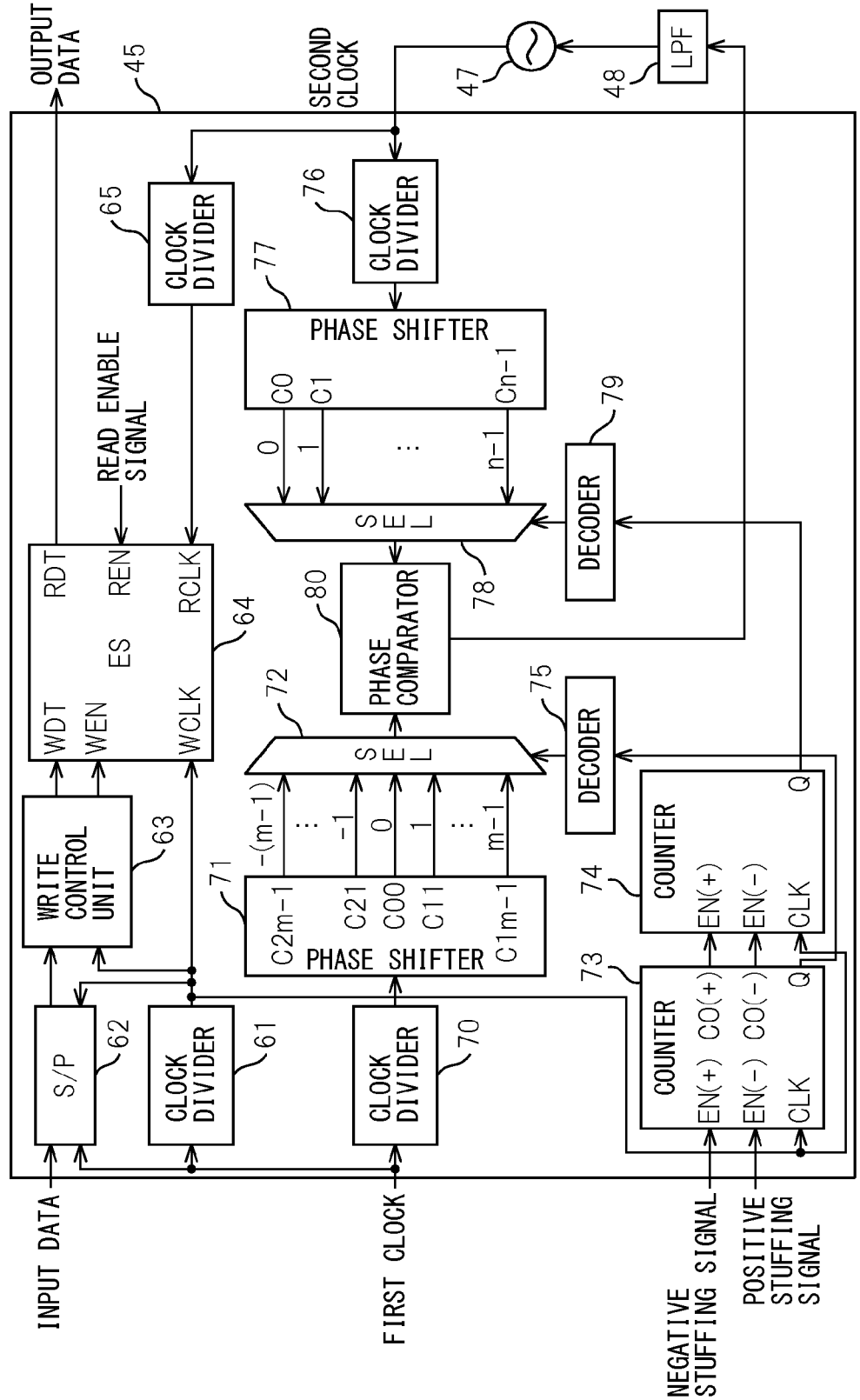
FIG. 14 is a view depicting the construction of a second example of a clock conversion unit.

Next, other exemplary embodiment of the clock conversion unit 45 will be described below. FIG. 14 is a view depicting the construction of a second example of the clock conversion unit. Same constituents as the constituents depicted in FIG. 6 are denoted by same reference numbers or symbols. Operation of the constituents denoted by same reference numerals or symbols is same unless otherwise noted.

In this exemplary embodiment, the phase shifter 71 outputs (2m−1) clock signals, C2$m$−1, . . . , C21, C00, C1, . . . , C1$m$−1 by imparting phase shift of (360/(n×m))×j to the divided clock of the first clock, where m is a natural number, and j is integers −(m−1) to (m−1).

The first SEL 72 selects one of (2m−1) clock signal and outputs it to the phase comparator 80 in accordance with the selection instructing signal outputted by the first decoder 75. The first decoder 75 generates the selection instructing signal for the first SEL 72 in accordance with the count Q of the first counter 73.

The first decoder 75 determines the value of the selection instructing signal such that, as the count Q of the first counter 73 varies "0" to "k", the value of the selection instructing signal varies stepwise "0" to "m−1". Also, the first decoder 75 determines the value of the selection instructing signal such that, as the count Q of the first counter 73 varies "0" to "−k", the value of the selection instructing signal varies stepwise "0" to "−(m−1)".

The second phase shifter 77 outputs n clock signals C0 to Cn−1 by imparting phase shifts of (360/n)×i, respectively, to the divided clock of the second clock, where n is a natural number, and i is an integer from 0 to (n−1).

The second SEL 78 selects, in accordance with the selection instructing signal outputted by the second decoder 79, one of n clock signals C0 to Cn−1 and outputs it to the phase comparator 80.

The second decoder 79 generates a selection instructing signal for the second SEL 78 in accordance with the count Q of the second counter 74. For example, the second decoder 79 generates a selection instructing signal indicating the count Q (Q=0 to (n−1)). When the selection instructing signal Q=0 to (n−1) is received, the second SEL 78 selects clock signal Cn−1 to C0, respectively, and outputs it to the phase comparator 80.

In this exemplary embodiment, as the count of stuffing of the first counter 73 varies from "0" to "k", the phase of the third clock varies stepwise at step width of "(360°/(n×m))" from "0" to "(360°/(n×m))×(m−1)".

On the other hand, each time the count of stuffing of the first counter 73 exceeds the upper bound value "k", the phase of the fourth clock is retarded by (360°/n). Also, each time the count of stuffing of the first counter 73 falls short of the lower bound value "−k", the phase of the fourth clock is advanced by (360°/n).

Therefore, the clock conversion unit 45 according to this exemplary embodiment can also control, as the exemplary embodiment illustrated in FIG. 6, the phase of the second clock in accordance with the count of stuffing in step width of (360°/(n×m)) over the entire 360°.

Figure 15:
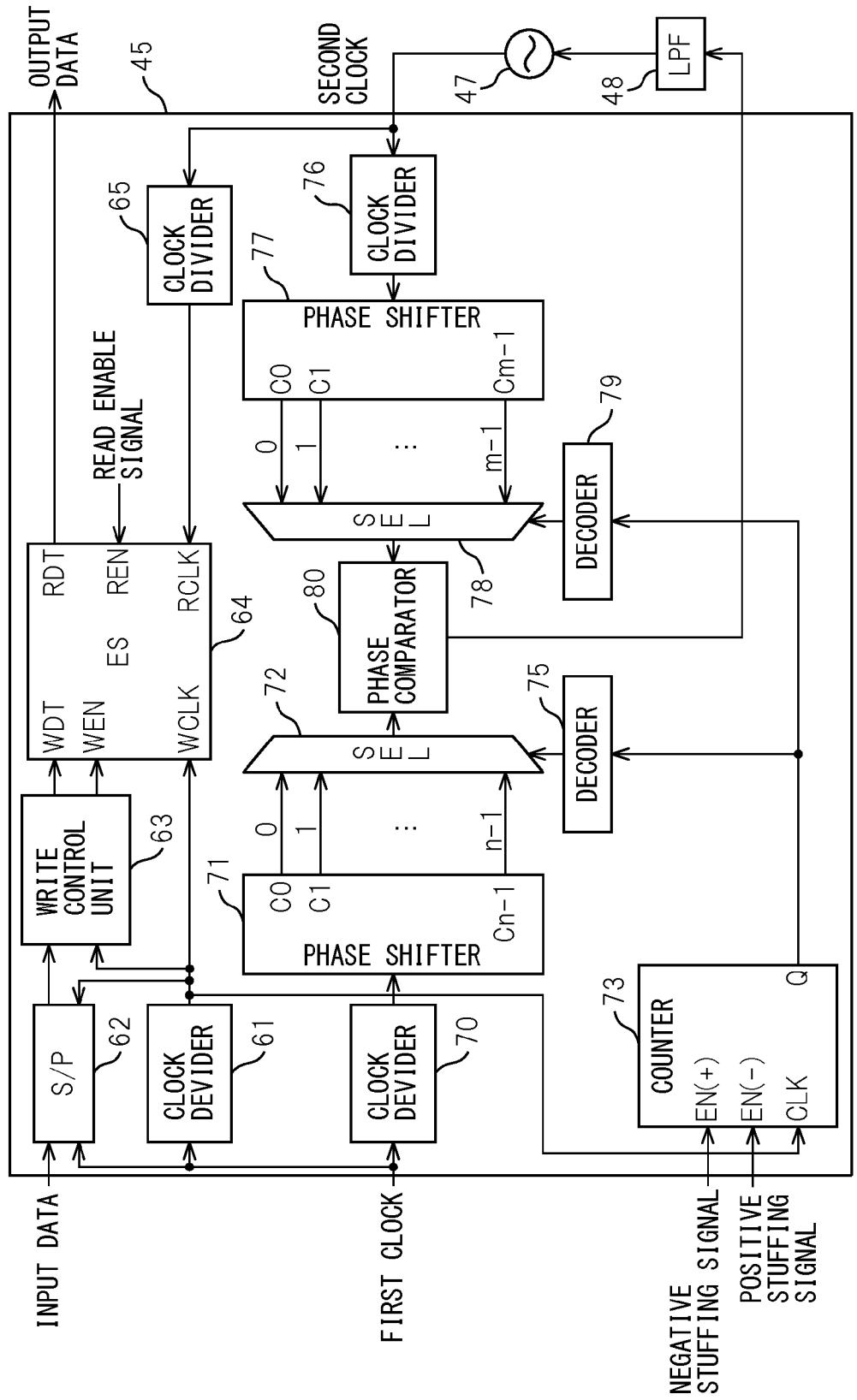
FIG. 15 is a view depicting the construction of a third example of a clock conversion unit.

Next, other exemplary embodiment of the clock conversion unit 45 will be described below. FIG. 15 is a view depicting the construction of a third example of the clock conversion unit. Same constituents as the constituents depicted in FIG. 6 are denoted by same reference numbers or symbols. Operation of the constituents denoted by same reference numerals or symbols is same unless otherwise noted.

In this exemplary embodiment, the first counter 73 receives positive stuffing signal and negative stuffing signal outputted from the demapper 44, respectively, as input EN(−) and EN(+), and counts the stuffing that has occurred. The counter 73 outputs the count Q to the first decoder 75 and the second decoder 79.

When the count of stuffing exceeds the upper bound value "n+m−1", the first counter 73 resets the count to "0." When the count of stuffing falls short of the lower bound value "0", the first counter 73 resets the count to "n+m−1."

The first phase shifter 71 outputs n clock signals C0 to Cn−1 obtained by imparting phase shift of (360/(m+n))×i to the divided clock of the first clock, where n is a natural number, and i is integers from 0 to (n−1). The first SEL 72 selects one of n clock signals C to Cn−1 in accordance with the selection instructing signal outputted by the first decoder 75, and outputs it to the phase comparator 80.

The second phase shifter 77 outputs m clock signals C0 to Cm−1 respectively obtained by imparting phase shift of (360°/(m+n))×i, where n is a natural number, and i are integers from 0 to (m−1). The second SEL 78 selects one of m clock signals C0 to Cm−1 in accordance with the instructing signal outputted from the second decoder 79, and outputs it to the phase comparator 80.

The first decoder 75 generates a selection instructing signal for the first SEL 72 in accordance with the count Q of the first counter 73. The first decoder 75 determines the value of the selection instructing signal such that, as the count Q of the first counter 73 varies "0" to "n+m−1", value of the selection instructing signal varies stepwise from "0" to "n−1".

The second decoder 79 generates a selection instructing signal for the second SEL 78 in accordance with the count Q of the first counter 73. The second decoder 79 determines the value of the selection instructing signal such that, as the count Q of the first counter 73 varies "0" to "n+m−1", value of the selection instructing signal varies stepwise from "m−1" to "0".

Relation of input value and output value of the first decoder 75 and the second decoder 79 is determined such that, when the count Q of the first counter 73 is increased by one, either the output value of the first decoder 75 and the second decoder is increased by one. Therefore, each time the count Q of the first counter 73 varies by one, the phase of either one of the third clock and the fourth clock is shifted by (360°/(m+n)).

Therefore, the number of steps of phase control of the second clock is the sum of the numbers of steps of the first phase shifter 71 and the second phase shifter 77, that is, the sum of "n" and "m", "n+m". Thus, the granularity of phase control of the second clock is 360°/(m+n).

FIG. 16 is a view illustrating an example of decoding executed by the first decoder 75 of FIG. 15. The first decoder 75 outputs a selection instructing signal of values "0" to "n−1", respectively, when the values of the count Q of the first counter 73 are "0" to "n−1". The first decoder 75 outputs a selection instructing signal of value "n−1" when the values of the count Q of the first counter are "n" to "n+m−1".

FIG. 17 is a view illustrating an example of decoding executed by the second decoder 79 of FIG. 15. The second decoder 79 outputs a selection instructing signal of value "m−1", respectively, when the values of the count Q of the first counter 73 are "0" to "n−1". The second decoder 79 outputs selection instructing signals of values "m−1" to "0" when the values of the count Q of the first counter are "n" to "n+m−1".

Also in accordance with this exemplary embodiment, as compared to the conventional construction in which a phase shifter is provided only for the divided clock of the first clock, combination of plural phase shifters respectively provided for divided clocks of the first clock and the second clock makes it possible to determine the granularity of the phase control of the second clock. Therefore, in accordance with this exemplary embodiment, the degree of freedom in determining the granularity of phase control for controlling the phase of the second clock can be increased. As a result, the degree of freedom in designing the capacity of ES 64 can be increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A clock conversion apparatus comprising:
    an elastic store memory in which data are written in synchronization with a first clock and from which data are read out in synchronization with a second clock;
    a first phase shifter configured to generate a first plurality of different clocks by imparting a first variable phase shift to a divided clock of the first clock;
    a second phase shifter configured to generate a second plurality of different clocks by imparting a second variable phase shift to a divided clock of the second clock;
    a first selector configured to output a third clock from among the first plurality of different clocks generated by the first phase shifter by selecting the first variable phase shift in accordance with a number of times of stuff reception;
    a second selector configured to output a fourth clock from among the second plurality of different clocks generated by the second phase shifter by selecting the second variable phase shift in accordance with the number of times of stuff reception;
    a phase comparator configured to detect a phase difference between the third clock and the fourth clock; and
    an oscillator configured to generate the second clock having a frequency in accordance with the phase difference.

2. The clock conversion apparatus according to claim 1,
    wherein the first phase shifter generates the first plurality of different clocks by imparting a phase shift of integral multiple of $360°/n$ (n is a natural number) as the first variable phase shift to the divided clock of the first clock; and
    wherein the second phase shifter generates the second plurality of different clocks by imparting a phase shift of integral multiple of $360°/(n\times m)$ (m is a natural number) as the second variable phase shift to the divided clock of the second clock.

3. The clock conversion apparatus according to claim 1,
    wherein the first phase shifter generates the first plurality of different clocks by imparting a phase shift of integral multiple of $360°/(n\times m)$ (n and m are natural numbers) as the first variable phase shift to the divided clock of the first clock; and
    wherein the second phase shifter generates the second plurality of different clocks by imparting a phase shift of integral multiple of $360°/n$ as the second variable phase shift to the divided clock of the second clock.

4. The clock conversion apparatus according to claim 1,
    wherein the first phase shifter generates the first plurality of different clocks by imparting a phase shift of i times $360°/(n+m)$ (n and m are natural numbers, i is an integer 0 to (n−1)) as the first variable phase shift to the divided clock of the first clock; and
    wherein the second phase shifter generates the second plurality of different clocks by imparting a phase shift of j times $360°/(n+m)$ (j is an integer 0 to (m−1)) as the second variable phase shift to the divided clock of the second clock.

5. A frame processing apparatus equipped with the clock conversion apparatus according to claim 1, comprising:
    a serial-parallel converter configured to receive a frame in synchronization with the first clock; and
    a demapper configured to detect payload from the frame;
    wherein the clock conversion apparatus writes data stored in the payload into the elastic store memory.

6. The frame processing apparatus according to claim 5, further comprising a decoder configured to generate a selection instructing signal for the first selector and the second selector in accordance with the number of times of stuff reception.

7. The frame processing apparatus according to claim 6, further comprising a counter configured to count the number of times of stuff reception; and
    wherein the decoder generates the selection instructing signal in accordance with the count value of stuff.

8. A frequency control method for controlling frequency of read-out clock of an elastic store memory into which data are written in synchronization with a first clock and from which data are read out in synchronization with a second clock, comprising:
    generating a first plurality of different clocks by imparting a first variable phase shift to a divided clock of the first clock;
    generating a second plurality of different clocks by imparting a second variable phase shift to a divided clock of the second clock;
    outputting a third clock from among the first plurality of different clocks by selecting the first variable phase shift in accordance with a number of times of stuff reception;
    outputting a fourth clock from among the second plurality of different clocks by selecting the second variable phase shift in accordance with a number of times of stuff reception;
    detecting a phase difference between the third clock and the fourth clock; and
    controlling the frequency of the second clock in accordance with the phase difference.

* * * * *